United States Patent [19]

Frey et al.

[11] Patent Number: 4,529,804
[45] Date of Patent: Jul. 16, 1985

[54] NAPHTHOSTYRIL NI OR CU COMPLEXES, A PROCESS FOR THEIR PREPARATION, AND HIGH MOLECULAR WEIGHT ORGANIC MATERIAL PIGMENTED WITH THESE METAL COMPLEXES

[75] Inventors: Christoph Frey, Aesch; Franz Felix, Münchenstein, both of Switzerland

[73] Assignee: Ciba-Geigy Corporation, Ardsley, N.Y.

[21] Appl. No.: 504,020

[22] Filed: Jun. 13, 1983

[30] Foreign Application Priority Data

Jun. 24, 1982 [CH] Switzerland ............... 3888/82

[51] Int. Cl.³ ............... C07D 401/12; C07D 403/12; C07F 15/04; C07F 1/08
[52] U.S. Cl. ............... 548/402; 546/12; 546/146; 546/169; 546/272; 524/89; 548/436; 548/255; 548/262; 548/336; 548/374
[58] Field of Search ............ 548/402, 436; 546/2, 546/12

[56] References Cited

U.S. PATENT DOCUMENTS 3,287,465 11/1966 Brack et al. ............... 260/305
4,268,668 5/1981 Harnisch et al. ............... 546/2 X

OTHER PUBLICATIONS

Dokunikhin, et al., Chemical Abstracts, vol. 62, 3996a–c, (1965).
N. S. Biradar et al., Current Science 45, 612–613, (1976).

Primary Examiner—Mark L. Berch
Attorney, Agent, or Firm—Luther A. R. Hall

[57] ABSTRACT

1:2 Nickel or 1:2 copper complexes of a naphthostyril of the formula

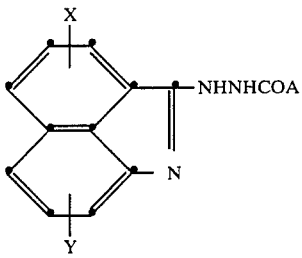

or of tautomers thereof, in which A, X and Y are as defined in claim 1, are suitable for pigmenting high molecular weight organic material.

11 Claims, No Drawings

NAPHTHOSTYRIL NI OR CU COMPLEXES, A PROCESS FOR THEIR PREPARATION, AND HIGH MOLECULAR WEIGHT ORGANIC MATERIAL PIGMENTED WITH THESE METAL COMPLEXES

The invention relates to 1:2 nickel or 1:2 copper complexes of a naphthostyril of the formula

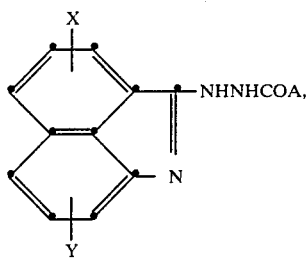
(I)

or of tautomers thereof, in which A is a carbocyclic or heterocyclic aromatic radical, and X and Y independently of each other are hydrogen, halogen, nitro, $C_1$–$C_6$-alkyl, $C_1$–$C_6$-alkoxy or alkylmercapto, $C_2$–$C_7$-alkoxycarbonyl, carbamoyl, $C_2$–$C_7$-alkylcarbamoyl, arylcarbamoyl, $C_2$–$C_6$-alkanoylamino or aroylamino. The compounds of formula (I) and of the formulae listed hereinafter will also be understood as comprising one of the possible tautomeric or mesomeric structures.

The carbocyclic aromatic radical A is for example a naphthyl radical bonded in the α- or in particular the β-position to the CO group, an anthraquinone radical bonded in the β-position to the CO group, or preferably a phenyl radical which is unsubstituted or substituted by chlorine, bromine or fluorine or methyl, phenyl, $C_1$–$C_6$-alkoxy, phenoxy, $C_2$–$C_7$-alkoxycarbonyl, carbamoyl, $C_2$–$C_7$-alkylcarbamoyl, $C_2$–$C_{13}$-dialkylamino or phenylcarbamoyl groups.

A heterocyclic aromatic radical A is for example a thiophene, imidazole, triazole, pyrazole, pyridine, quinoline, isoquinoline, coumarin or imidazole radical. The 2-thienyl and/or 3- or 4-pyridyl radicals are preferred.

X and Y are preferably fluorine, bromine or in particular chlorine, methyl or methoxy or ethoxy, methylmercapto, ethylmercapto, methoxycarbonyl, ethoxycarbonyl, carbamoyl, methylcarbamoyl, ethylcarbamoyl, phenylcarbamoyl, acetylamino or benzoylamino. X and Y are particularly preferably H atoms.

Metal complexes of compounds of the formula (I) are obtained by treating a naphthostyril of the formula

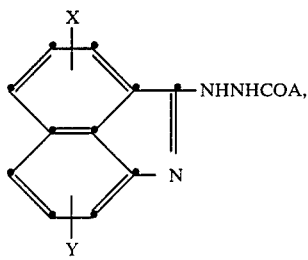
(I)

in which A, X and Y are as defined above, with nickel- or copper-donating agents. The nickel- or copper-donating agents are preferably the formates, stearates, acetylacetonates or especially the acetates of these metals.

The metallisation is advantageously carried out in an organic solvent. Examples of suitable organic solvents are in particular ethanol, butanol, acetic acid, dioxane, dimethylformamide, pyridine, alkylene glycol monomethyl or monoethyl ethers, and N-methylpyrrolidine. The solvent used can also be water, if desired as a mixture with one of the organic solvents mentioned.

The metallisation is preferably carried out at elevated temperatures, in particular between 50° C., especially 80° C., and the boiling point of the solvent used. The resulting metal complexes are easily isolated by filtration. Any impurities can be washed out.

Naphthostyrils of the formula (I) are obtained by condensing a compound of the formula

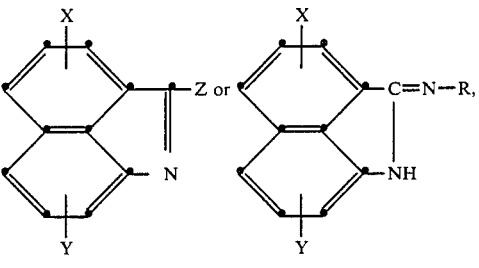

(II) (III)

in which Z is a reactive radical, in particular an alkylmercapto group, R is a phenyl radical, and X and Y are as defined above, with a hydrazide of the formula $$H_2NNHCOA \qquad (IV),$$

in which A is as defined above. This condensation is advantageously carried out in one of the abovementioned solvents at elevated temperatures, in particular between 80° C. and the boiling point of the solvent.

Compounds of the formula (II) are obtained by a known method, namely by reacting a naphtholactam of the formula

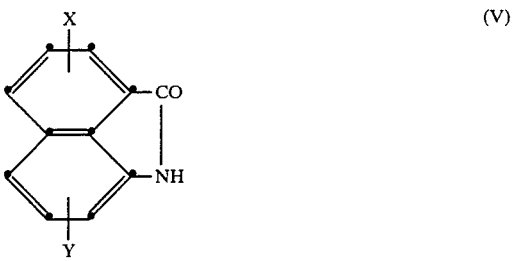
(V)

with phosphorus pentasulfide, for example, and then alkylating.

Compounds of the formula (III) are also obtained by a known method, namely by reacting the naphtholactam of the formula (V), for example with aniline in the presence of phosphorus oxychloride.

The naphthostyrils of the formula (I) can also be obtained through direct condensation of the naphtholactam of the formula (V) with the hydrazide of the formula (IV) in the presence of phosphorus oxychloride.

Specific examples of naphtholactams of the formula (V) are 1,8-naphtholactam, 4-chloro-1,8-naphtholactam, 4-bromo-1,8-naphtholactam, 2,4-dichloro-1,8-naphtholactam, 2,4-dibromo-1,8-naphtholactam, 4- methoxy-1,8-naphtholactam, 4-methylmercapto-1,8-naphtholactam, 4-nitro-1,8-naphtholactam, 4-acetylamino-1,8-naphtholactam, 2-ethyl-1,8-naphtholactam and 5-phenylcarbamoyl-1,8-naphtholactam.

Specific examples of hydrazides of the formula (IV) are the hydrazides of the benzoic acids 2-, 3- or 4-fluorobenzoic acid, 2-, 3- or 4-chlorobenzoic acid, 2-, 3- or 4-bromobenzoic acid, 3- or 4-methylbenzoic acid, 3- or 4-methoxybenzoic acid, 4-nitrobenzoic acid, 2,4- or 3,4-dichlorobenzoic acid, 3,4-dimethoxybenzoic acid, 3,5-dimethoxybenzoic acid, 4-diphenylcarboxylic acid, 3- or 4-acetamidobenzoic acid, 3- or 4-benzoylamidobenzoic acid, 4-cyanobenzoic acid and 4-chloro-3-acetamidobenzoic acid.

Some of the pigments of the invention can be used directly as crude products. If desired, however, the crude products can be converted by grinding or kneading into a finely divided form. This is best accomplished with the use of grinding assistants, such as inorganic and/or organic salts, in the presence or absence of organic solvents. After the grinding, the grinding assistants are removed in a customary manner: soluble inorganic salts for example by means of water, and water-insoluble organic assistants for example by steam distillation. The properties can frequently even be improved, if desired, by treating the crude pigments with organic solvents, preferably with those which boil above 100° C. Particularly suitable solvents are halogen-, alkyl- or nitro-substituted benzenes, such as xylenes, chlorobenzene, o-dichlorobenzene or nitrobenzene, pyridine, picoline, quinoline, ketones, such as cyclohexanone, ethers, such as ethylene glycol monomethyl or monoethyl ether, amides, such as dimethylformamide or N-methylpyrrolidone, dimethyl sulfoxide, sulfolane or water alone, if desired under pressure. The aftertreatment can also be carried out in water in the presence of organic solvents and/or of surface-active substances.

The aftertreatment preferably consists in heating the pigment to 100° to 200° C. in water or a solvent, and results in certain cases in a harsher texture and possibly a crystal modification, with a favourable effect on the light and migration fastness of the resulting pigments.

The pigments of the invention are suitable for pigmenting high molecular weight compounds, for example cellulose ethers and cellulose esters, such as ethylcellulose, acetylcellulose, nitrocellulose, polyamides, polyurethanes, polyesters, natural resins, synthetic resins, for example aminoplasts, in particular urea- and melamine-formaldehyde resins, alkyd resins, phenoplasts, polycarbonates, polyolefins, such as polystyrene, polyvinyl chloride, polyethylene, polypropylene, polyacrylonitrile, polyacrylates, thermoplastic or thermosetting acrylic resins, rubber, casein, silicone or silicone resins, singly or mixed. The high molecular weight compounds mentioned can be in the form of plastic compositions, melts, spinning solutions, paints or printing inks. Depending on the intended use, it is advantageous to use the pigments as toners or as preparations. Finally, the novel pigments can also be used as photo-electrophoretic toners.

To pigment paints and printing inks, the high molecular weight organic materials and the nickel or copper complexes of compounds of the formula (I), if desired together with additives such as fillers, other pigments, siccatives or plasticisers, are finally dispersed or dissolved in a joint organic solvent or solvent mixture. One possible way of doing this is to disperse or dissolve the individual components by themselves or several components together, and only then to bring all the components together.

The pigmented high molecular weight organic materials generally contain amounts of 0.001 to 30% by weight of the nickel or copper complex of a compound of the formula (I), based on the high molecular weight organic material to be pigmented; polyplasts and paints preferably contain 0.1 to 10% by weight, while printing inks preferably contain 10–30% by weight. The amount of pigment is primarily chosen in accordance with the desired depth of shade, and also in accordance with the wall thickness of the moulding and finally, where appropriate, also in accordance with the white pigment content in the polymer.

The resulting colours, for example in plastics, fibres or paints, are distinguished by very high tinctorial strength, substantial opacity, good dispersibility, good migration and overlacquering fastness properties, excellent light and water fastness properties, high gloss, good rheological properties and good IR reflectance properties.

EXAMPLES

Example 1

27.7 g (0.2 mol) of benzhydrazide are added to a solution of 65.4 g (0.2 mol) of 2-methylthiobenz(c,d)indole hydroiodide of the formula

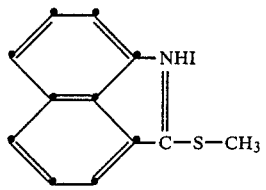

in 250 ml of pyridine, and the mixture is heated with stirring to 100°–105° C. and is held at this temperature for 3 hours. On cooling down, the mixture is diluted with 1,500 ml of cold water, and filtered. The filter cake is thoroughly washed with methanol and hot water and dried at 70°–100° in vacuo. If necessary, the resulting product of the formula

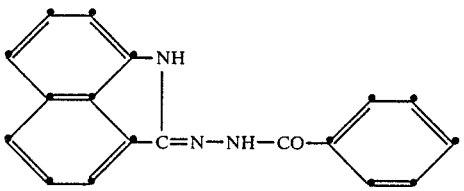

can be recrystallized from dimethylformamide to give a yellow crystalline powder. Corrected melting point: 264°–266° C.

Analysis: Calculated: C 75.25%, H 4.56%, N 14.63%, O 5.57%. Found: C 75.0%, H 4.6%, N 14.5%, O 5.5%.

Example 2

12.2 g (0.05 mol) of the anil of the formula

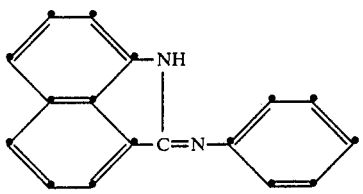

are heated together with 6.8 g (0.05 mol) of benzhydrazide in 100 ml of ethylene glycol monoethyl ether and 5 ml of glacial acetic acid with stirring at 125° C. for 3 hours, the mixture is allowed to cool down and is filtered, and the filter cake is washed with methanol and water to give the same product as in Example 1. Corrected melting point: 264°–266°.

Analysis: Calculated: C 75.25%, H 4.56%, N 14.63%, O 5.57%. Found: C 75.3%, H 4.7%, N 14.9%, O 5.6%.

Example 3

A mixture of 7.2 ml of phosphorus oxychloride and 2.8 ml of phorphorus trichloride is added dropwise with stirring at 60°–65° C. to a mixture of 16.9 g of naphthostyril and 13.9 g of benzyhydrazide in 100 ml of chlorobenzene, and the reaction mixture is held at this temperature for 4 hours. On cooling down, it is poured onto ice and water, the resulting mixture is neutralised with dilute sodium hydroxide solution to a pH of about 8, and the solvent is driven off with steam. When the mixture left behind is cooled down, the product is filtered off and washed. It can now be suspended in methanol and be dissolved with dilute sodium hydroxide solution. Charcoal is added to the solution and then filtered off, and the product is reprecipitated with glacial acetic acid or dilute hydrochloric acid, and it is the same as in Example 1. Corrected melting point: 264°–266.2°.

Example 4

The complex is formed by heating with stirring at 127° (reflux) for 4 hours 4.0 g of the compound obtained in Example 1, in 100 ml of ethylene glycol monoethyl ether to which 1.91 g of Ni acetate.4H$_2$O have been added. The precipitate is filtered off hot, washed with methanol and water and dried. This gives a dark red powder which is brought into a finely divided form by, for example, grinding it in isopropanol with the aid of a grinding medium. It colours polyvinyl chloride in red shades having good migration and light fastness properties. A paint pigmented with the nickel complex obtained has very good light and weather resistance.

The solvent used need not be ethylene glycol monoethyl ether but can just as well be for example dimethylformamide, n-butanol or even water to which, if desired, catalytic amounts of sodium hydroxide solution or sodium acetate can be added.

Analysis: Calculated: C 68.49%, H 3.83%, N 13.31%, Ni 9.30%. Found: C 68.4%, H 4.1%, N 12.3%, Ni 9.03%.

The following Table (I) shows further metal complexes which are obtained by metallising the naphthostyril of the formula (I) in which X and Y are H and A is the radical given in column 2, by the method of Example 4.

TABLE I

| Example No. | A | Metal | Shade | Analysis | | | | | | | | |
|---|---|---|---|---|---|---|---|---|---|---|---|---|
| 5 | Phenyl | Cu | reddish yellow | calculated: found: | C | 67.97% 67.6% | H | 3.80% 3.9% | N | 13.21% 13.4% | Cu | 9.99% 10.3% |
| 6 | p-Chlorophenyl | Ni | orange | calculated: found: | C | 61.75% 62.1% | H | 2.17% 3.3% | Cl 10.13% 9.8% | N 12.00% 12.3% | Ni | 8.39% 8.25% |
| 7 | p-Chlorophenyl | Cu | yellow | calculated: found: | C | 61.33% 60.9% | H | 3.15% 3.3% | Cl 10.06% 9.8% | N 11.92% 11.7% | Cu | 9.01% 9.01% |
| 8 | p-Tolyl | Ni | red | calculated: found: | C | 69.22% 69.4% | H | 4.28% 4.2% | | N 12.75% 12.9% | Ni | 8.90% 8.52% |
| 9 | p-Tolyl | Cu | reddish yellow | calculated: found: | C | 68.71% 68.8% | H | 4.25% 4.3% | | N 12.65% 12.7% | Cu | 9.57% 9.49% |
| 10 | 2,4-Dichlorophenyl | Ni | orange | calculated: found: | C | 56.22% 56.5% | H | 2.62% 2.5% | Cl 18.44% 18.3% | N 10.93% 11.3% | Ni | 7.63% 7.27% |
| 11 | 2,4-Dichlorophenyl | Cu | yellow | calculated: found: | C | 55.87% 55.2% | H | 2.60% 2.7% | Cl 18.32% 18.1% | N 10.86% 10.62% | Cu | 8.21% 8.42% |
| 12 | m-Tolyl | Ni | red | calculated: found: | C | 69.22% 69.0% | H | 4.28% 4.1% | | N 12.75% 13.0% | Ni | 8.90% 8.97% |
| 13 | m-Tolyl | Cu | reddish yellow | calculated: found: | C | 68.72% 68.2% | H | 4.25% 4.1% | | N 12.65% 12.6% | Cu | 9.57% 9.98% |
| 14 | 2,4-Dichlorophenyl | Zn | yellow | calculated: found: | C | 55.74% 55.4% | H | 2.60% 2.8% | Cl 18.28% 17.8% | N 10.83% 10.6% | Zn | 8.43% 8.23% |
| 15 | 3,4-Dichlorophenyl | Ni | orange | calculated: found: | C | 56.22% 56.6% | H | 2.62% 2.8% | Cl 18.44% 18.0% | N 10.93% 10.9% | Ni | 7.63% 7.43% |
| 16 | β-Naphthyl | Ni | red | calculated: found: | C | 72.25% 72.2% | H | 3.86% 4.0% | | N 11.49% 11.5% | Ni | 8.03% 7.86% |
| 17 | β-Naphthyl | Cu | orange | calculated: found: | C | 71.78% 71.1% | H | 3.83% 3.9% | | N 11.41% 12.0% | Cu | 8.63% 8.5% |
| 18 | 2-Thienyl | Ni | red | calculated: found: | C | 59.74% 59.8% | H | 3.13% 3.1% | N 13.06% 13.1% | S 9.97% 10.0% | Ni | 9.13% 9.12% |
| 19 | 2-Thienyl | Cu | yellowish orange | calculated: found: | C | 59.29% 59.0% | H | 3.11% 3.1% | N 12.97% 12.9% | S 9.89% 9.5% | Cu | 9.80% 9.88% |
| 20 | 3-Fluorophenyl | Ni | orange | calculated: found: | C | 64.8% 64.7% | H | 3.3% 3.3% | F 5.7% 5.8% | N 12.6% 12.4% | Ni | 8.85% 8.69% |
| 21 | 3-Fluorophenyl | Cu | yellow | calculated: found: | C | 64.33% 64.0% | H | 3.30% 3.7% | F 5.65% 5.7% | N 12.50% 12.9% | Cu | 9.45% 9.41% |
| 22 | 4-Bromophenyl | Ni | orange | calculated: found: | C | 54.79% 54.9% | H | 2.81% 2.8% | Br 20.25% 20.4% | N 10.65% 10.6% | Ni | 7.44% 7.32% |
| 23 | 4-Bromophenyl | Cu | yellow | calculated: found: | C | 54.46% 54.3% | H | 2.79% 3.0% | Br 20.13% 20.1% | N 10.59% 10.9% | Cu | 8.00% 8.01% |
| 24 | 4-Methoxyphenyl | Ni | red | calculated: | C | 66.01% | H | 4.08% | | N 12.16% | Ni | 8.49% |

TABLE I-continued

| Example No. | A | Metal | Shade | Analysis | | | | | | | | |
|---|---|---|---|---|---|---|---|---|---|---|---|---|
| 25 | 4-Methoxyphenyl | Cu | reddish yellow | calculated: C | 65.56% | H | 4.05% | | | N | 12.07% | Cu | 9.13% |
| | | | | found: | 65.5% | | 4.2% | | | | 12.3% | | 8.56% |
| | | | | | 65.0% | | 4.3% | | | | 12.2% | | 9.36% |
| 26 | o-Tolyl | Ni | reddish brown | calculated: C | 69.22% | H | 4.28% | | | N | 12.75% | Ni | 8.90% |
| | | | | found: | 69.1% | | 4.2% | | | | 13.0% | | 8.88% |
| 27 | o-Tolyl | Cu | yellowish brown | calculated: C | 68.71% | H | 4.25% | | | N | 12.65% | Cu | 9.57% |
| | | | | found: | 67.4% | | 4.3% | | | | 12.6% | | 10.4% |
| 28 | 3-Amino-4-chlorophenyl | Ni | orange | calculated: C | 59.4% | H | 3.3% | Cl | 9.7% | N | 15.4% | Ni | 8.0% |
| | | | | found: | 59.4% | | 3.3% | | 9.6% | | 15.6% | | 7.89% |
| 29 | 3-Amino-4-chlorophenyl | Cu | reddish yellow | calculated: C | 59.0% | H | 3.3% | Cl | 9.7% | N | 15.3% | Cu | 8.6% |
| | | | | found: | 58.5% | | 3.6% | | 9.5% | | 15.4% | | 8.5% |
| 30 | 3-Acetylaminophenyl | Ni | yellowish red | calculated: C | 64.63% | H | 3.80% | | | N | 15.07% | Ni | 7.90% |
| | | | | found: | 64.2% | | 4.2% | | | | 15.1% | | 7.80% |
| 31 | 3-Acetylaminophenyl | Cu | reddish yellow | calculated: C | 64.21% | H | 3.77% | | | N | 14.98% | Cu | 8.49% |
| | | | | found: | 63.9% | | 4.4% | | | | 14.9% | | 8.47% |
| 32 | 4-Benzoylaminophenyl | Ni | red | calculated: C | 69.06% | H | 3.34% | | | N | 12.89% | Ni | 6.75% |
| | | | | found: | 68.7% | | 4.1% | | | | 12.8% | | 6.61% |
| 33 | 4-Benzoylaminophenyl | Cu | reddish yellow | calculated: C | 68.68% | H | 3.92% | | | N | 12.82% | Cu | 7.27% |
| | | | | found: | 68.4% | | 4.2% | | | | 12.9% | | 7.31% |
| 34 | 4-Cyanophenyl | Ni | bluish red | calculated: C | 66.99% | H | 3.25% | | | N | 16.45% | Ni | 8.62% |
| | | | | found: | 66.6% | | 3.7% | | | | 16.4% | | 8.51% |
| 35 | 4-Cyanophenyl | Cu | orange | calculated: C | 66.52% | H | 3.23% | | | N | 16.33% | Cu | 9.26% |
| | | | | found: | 65.9% | | 3.2% | | | | 16.1% | | 9.47% |
| 36 | 4-Pyridyl | Cu | reddish yellow | calculated: C | 63.29% | H | 4.53% | | | N | 17.37% | Cu | 9.85% |
| | | | | found: | 63.8% | | 4.0% | | | | 17.4% | | 9.95% |
| 37 | 3,4-Dichlorophenyl | Cu | reddish yellow | calculated: C | 55.87% | H | 2.60% | Cl | 18.32% | N | 10.86% | Cu | 8.21% |
| | | | | found: | 55.4% | | 2.7% | | 17.8% | | 11.1% | | 8.17% |

Examples 38-40

Table 2 below lists further metal complexes which are obtained by metallising the naphthostyrils of the formula (I) in which A, X and Y are the radicals given in columns 2-4, by the method of Example 4.

TABLE 2

| Example No. | A | X | Y | Metal | Shade | Analysis | | | | | | | |
|---|---|---|---|---|---|---|---|---|---|---|---|---|---|
| 38 | p-Chlorophenyl | H | 4-Cl | Ni | orange | calculated: C | 56.22% | H | 2.62% | Cl | 18.44% | N | 10.93% | Ni | 7.63% |
| | | | | | | found: | 55.9% | | 2.8% | | 18.1% | | 11.1% | | 7.49% |
| 39 | p-Chlorophenyl | H | 4-Cl | Cu | reddish yellow | calculated: C | 55.87% | H | 2.60% | Cl | 18.32% | N | 10.86% | Cu | 8.21% |
| | | | | | | found: | 55.2% | | 2.8% | | 17.9% | | 10.9% | | 8.13% |
| 40 | p-Chlorophenyl | 5-COOCH$_3$ | H | Ni | violet | calculated: C | 58.86% | H | 3.21% | Cl | 8.69% | N | 10.30% | Ni | 7.19% |
| | | | | | | found: | 58.6% | | 3.3% | | 8.6% | | 10.3% | | 7.16% |

Example 41

68 g of polyvinyl chloride powder (the product of a suspension polymerisation), 33 g of dioctyl phthalate, 2 g of dibutyltin laurate, 0.3 g of a phosphate-based stabiliser and 0.7 g of the pigment prepared in Example 4 are mixed and worked on hot mixing rolls at 160° C. for 15 minutes. A 0.4 mm thick film is then prepared on a calender. The red colour of the film is heat-resistant and light-, weather- and migration-fast.

Example 42

0.2 g of the pigment prepared in Example 4, 1 g of titanium dioxide (rutile) and 100 g of LD polyethylene granules are mixed in a drum, and the mixture is then worked at 130° on mixing rolls. The hot material is compression-moulded or extruded into sheets. The red sheets obtained have excellent light and weather fastness.

Example 43

0.1 g of the pigment prepared in Example 4, 0.5 g of titanium dioxide (rutile) and 100 g of polypropylene granules are mixed in a drum, and the mixture is then worked at 190° C. on mixing rolls until it is uniformly coloured. The hot material is compression-moulded into 1 mm sheets. The red sheets obtained have good light and weather fastness.

Example 44

100 g of stabilised polyvinyl chloride are mixed with 1 g of a preparation obtained by salt-kneading 0.5 g of pigment with 0.5 g of a copolymer composed of 85% by weight of polyvinyl chloride and 15% by weight of polyvinyl acetate, and the mixture is rolled at 190° C. for 6 minutes. The roll base is manually agitated until good pigment distribution is obtained. The mass is then cooled back down from 190°-200° C. under pressure in a mould. The sheets coloured red in this way are distinguished by high light and weather fastness.

Rigid PVC can be coloured a brightened weather-fast red in the same way if titanium dioxide is added to the batch while the coloured pigment content remains the same or is reduced.

Example 45

10 g of titanium dioxide and 2 g of the pigment prepared in Example 4 are ball-milled for 48 hours together with 8.8 g of a mixture of 26.4 g of coconut-alkyd resin, 24.0 g of melamine-formaldehyde resin (50% solids content), 8.8 g of ethylene glycol monomethyl ether and 28.8 g of xylene.

This paint is sprayed onto an aluminium foil, is pre-dried at room temperature for 30 minutes and is then baked at 120° C. for 30 minutes to give a red coat of paint which combines good tinctorial strength with very good overlacquering, light and weather fastness.

What is claimed is:

1. A 1:2 nickel or 1:2 copper complex of a naphthostyril of the formula

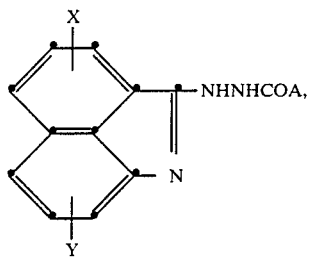

or of a tautomer thereof, in which A is α-naphthyl, β-naphthyl, β-anthraquinonyl, phenyl, phenyl substituted by chlorine, by bromine, by fluorine, by methyl, by phenyl, by $C_1$–$C_6$-alkoxy, by phenoxy, by $C_2$–$C_7$-alkoxycarbonyl, by carbamoyl, by $C_2$–$G_7$-alkylcarbamoyl, by $C_2$–$C_{13}$-dialkylamino or by phenylcarbamoyl; or is thienyl, imidazolyl, triazolyl, pyrazolyl, pyridyl, quinolyl, isoquinolyl or coumaryl, and X and Y independently of each other are hydrogen, halogen, nitro, $C_1$–$C_6$-alkyl, $C_1$–$C_6$-alkoxy, $C_1$–$C_6$-alkylmercapto, $C_2$–$C_7$-alkoxycarbonyl, carbamoyl, $C_2$–$C_7$-alkylcarbamoyl, arylcarbamoyl, $C_2$–$C_6$-alkanoylamino or aroylamino.

2. A 1:2 nickel or 1:2 copper complex of a naphthostyril of a claim 1 formula I in which A is phenyl, or phenyl substituted by chlorine, bromine or fluorine or methyl, phenyl, $C_1$–$C_6$-alkoxy, phenoxy, $C_2$–$C_7$-alkoxycarbonyl, carbamoyl, $C_2$–$C_7$-alkylcarbamoyl, $C_2$–$C_{13}$-dialkylamino or phenylcarbamoyl groups, or naphthyl.

3. A 1:2 nickel or 1:2 copper complex of a naphthostyril of a claim 1 formula I in which A is thienyl or pyridyl.

4. A 1:2 nickel or 1:2 copper complex of a naphthostyril of a claim 1 formula I in which X and Y are H atoms.

5. A 1:2 nickel or 1:2 copper complex of a naphthostyril of the formula

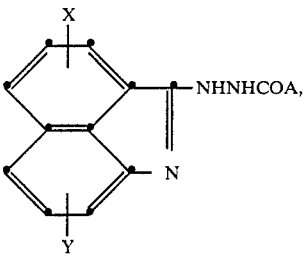

wherein
A is β-naphthyl, phenyl, p-chlorophenyl, p-tolyl, 2,4-dichlorophenyl, m-tolyl, 3,4-dichlorophenyl, 3-fluorophenyl, 4-bromophenyl, 4-methoxyphenyl, o-tolyl, 3-amino-4-chlorophenyl, 3-acetylaminophenyl, 4-benzoylaminophenyl, 4-cyanophenyl, 2-thienyl or 4-pyridyl,
X is hydrogen, and
Y is hydrogen.

6. The compound of claim 5 of the formula

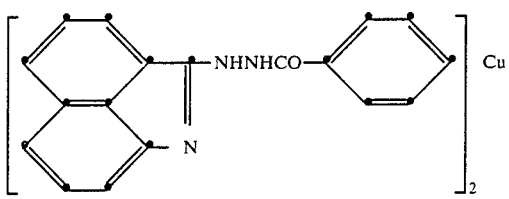

7. The compound of claim 5 of the formula

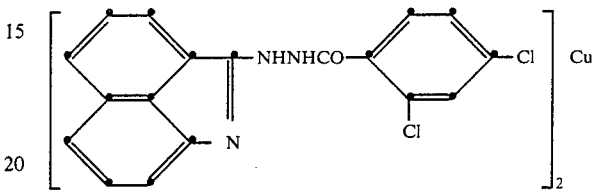

8. The compound of claim 5 of the formula

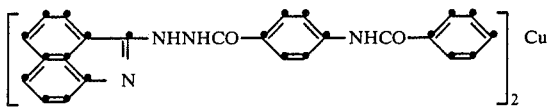

9. The compound of claim 5 of the formula

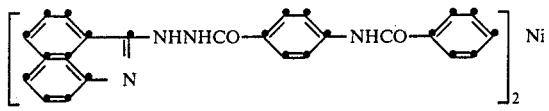

10. The compound of claim 5 of the formula

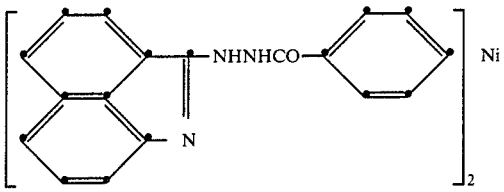

11. A 1:2 nickel or 1:2 copper complex of a naphthostyril of the formula

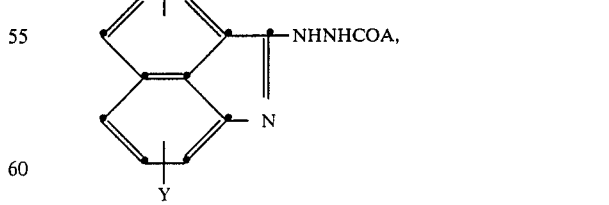

wherein A is p-chlorophenyl, X is hydrogen and Y is 4-chloro; or A is p-chlorophenyl, X is 5-$COOCH_3$ and Y is hydrogen.

* * * * *